United States Patent
Thore et al.

(10) Patent No.: US 11,378,717 B2
(45) Date of Patent: Jul. 5, 2022

(54) ESTIMATING IN SITU STRESS FIELD

(71) Applicants: Total S.A., Courbevoie (FR);
ASSOCIATION SCIENTIFIQUE POUR LA GEOLOGIE ET SES APPLICATIONS, Vandoeuvre les Nancy (FR)

(72) Inventors: Pierre Thore, Ciboure (FR); Antoine Mazuyer, Pau (FR)

(73) Assignees: TOTAL SE, Courbevoie (FR);
ASSOCIATION SCIENTIFIQUE POUR LA GEOLOGIE ET SES APPLICATIONS, Vandoeuvre les Nancy (FR)

(*) Notice: Subject to any disclaimer, the term of this patent is extended or adjusted under 35 U.S.C. 154(b) by 585 days.

(21) Appl. No.: 16/353,841

(22) Filed: Mar. 14, 2019

(65) Prior Publication Data
US 2019/0285764 A1    Sep. 19, 2019

(30) Foreign Application Priority Data
Mar. 16, 2018    (EP) .................................... 18305290

(51) Int. Cl.
*G01V 99/00*    (2009.01)
*G01V 1/28*    (2006.01)
*G01V 1/30*    (2006.01)

(52) U.S. Cl.
CPC ............ *G01V 99/005* (2013.01); *G01V 1/282* (2013.01); *G01V 1/306* (2013.01); *G01V 2210/62* (2013.01); *G01V 2210/663* (2013.01)

(58) Field of Classification Search
CPC . G01V 13/00; G01V 1/28; G01V 1/30; G01V 1/50; G01V 1/301; G01V 1/302;
(Continued)

(56) References Cited

U.S. PATENT DOCUMENTS 7,526,385 B2    4/2009 Sayers
7,882,745 B2    2/2011 Huang et al.
(Continued)

FOREIGN PATENT DOCUMENTS

CN    1752356 A    7/2010
CN    201535704 U    7/2010
(Continued)

OTHER PUBLICATIONS

Wikipedia contributors. "Drucker-Prager yield criterion." Wikipedia, The Free Encyclopedia. Wikipedia, The Free Encyclopedia, Aug. 18, 2016. Web. Sep. 15, 2021. (Year: 2016).*
(Continued)

*Primary Examiner* — Daniel R Miller
*Assistant Examiner* — Eric Sebastian Von Wald
(74) *Attorney, Agent, or Firm* — Knobbe Martens Olson & Bear, LLP

(57) ABSTRACT

It is proposed a method which comprises providing a geomechanical model of the geological environment, measurements of a first geological attribute each performed at a respective first position of the geological environment, constraints on a second geological attribute related to a yield criterion and each assigned to a respective second position of the geological environment, and a geomechanical simulator. The method also comprises determining the stress field derivable from the data outputted by the geomechanical simulator taking as input the geomechanical model and an optimal set of one or more boundary conditions. This provides an improved solution for estimating in situ stress field of a geological environment.

20 Claims, 3 Drawing Sheets

(58) Field of Classification Search
CPC .......... G01V 1/306; G01V 1/307; G01V 1/34;
G01V 1/36; G01V 1/368; G01V 1/40;
G01V 1/46; G01V 1/52; G01V 2210/61;
G01V 2210/612; G01V 2210/616; G01V
2210/624; G01V 2210/64; G01V
2210/65; G01V 2210/66; G01V 2210/07
See application file for complete search history.

(56) References Cited

U.S. PATENT DOCUMENTS

| | | | |
|---|---|---|---|
| 9,164,192 | B2 | 10/2015 | Maerten et al. |
| 2009/0070042 | A1 | 3/2009 | Birchwood et al. |
| 2013/0176822 | A1* | 7/2013 | Thore .................... G01V 1/306 367/73 |
| 2015/0301223 | A1 | 10/2015 | Xu et al. |
| 2015/0369937 | A1* | 12/2015 | Bergey .................. G01V 1/306 702/11 |
| 2016/0011333 | A1 | 1/2016 | Maerten et al. |
| 2016/0116637 | A1 | 4/2016 | Blanchard et al. |
| 2017/0131192 | A1 | 5/2017 | Perez et al. |
| 2017/0205522 | A1 | 7/2017 | Thore et al. |
| 2017/0205531 | A1* | 7/2017 | Berard ...................... E21B 7/04 |
| 2017/0235016 | A1 | 8/2017 | Prioul et al. |
| 2017/0315266 | A1* | 11/2017 | Myers .................. G01V 99/005 |

FOREIGN PATENT DOCUMENTS

| | | | |
|---|---|---|---|
| GB | 2528130 A * | 1/2016 | ............. G01V 1/308 |
| WO | WO 2001/094982 A2 | 12/2001 | |
| WO | WO 2007/056278 A2 | 5/2007 | |
| WO | WO 2009/002872 A1 | 12/2008 | |
| WO | WO 2009/029133 A1 | 3/2009 | |
| WO | WO 2013/172813 A1 | 11/2013 | |
| WO | WO 2015/003028 A1 | 1/2015 | |
| WO | WO 2015/168417 A1 | 11/2015 | |
| WO | WO 2016/187237 A1 | 11/2016 | |
| WO | WO 2017/035371 A1 | 3/2017 | |
| WO | WO 2017/136208 A1 | 8/2017 | |

OTHER PUBLICATIONS

Wikipedia contributors. "Sigmoid function." Wikipedia, The Free Encyclopedia. Wikipedia, The Free Encyclopedia, Feb. 5, 2017. Web. Sep. 15, 2021. (Year: 2017).*
Extended European Search Report for European App. No. 18305290. 1, dated Sep. 17, 2018, in 9 pages.
Mazuyer et al. "Stress estimation in reservoirs using an integrated inverse method," Computers and Geoscience, vol. 114, Feb. 12, 2018, pp. 30-40, ISSN: 0098-3004, DOI: 10.1016/j.cageo.2018.01. 004.
M. Addis, T. Hanssen, N. Yassir, D. Willoughby, J. Enever, et al. "A comparison of leak-off test and extended leak-off test data for stress estimation." SPE/ISRM Rock Mechanics in Petroleum Engineering, 1998.
B. Amadei. "Importance of anisotropy when estimating and measuring in situ stresses in rock." International Journal of Rock Mechanics and Mining Sciences & Geomechanics Abstracts, vol. 33, p. 293-325, 1996.
B. Amadei et O. Stephansson. "Rock Stress and Its Measurement." Springer Netherlands, Dordrecht, 1997. ISBN 978-94-010-6247-3. doi: 10.1007/978-94-011-5346-1.
M. S. Ameen, B. G. Smart, J. M. Somerville, S. Hammilton, et N. A. Naji. "Predicting rock mechanical properties of carbonates from wireline logs (A case study: Arab-D reservoir, Ghawar field, Saudi Arabia)." Marine and Petroleum Geology, 26(4): 430-444, 2009.
F. Aminzadeh, N. Burkhard, L. Nicoletis, F. Rocca, et K. Wyatt. "Seg/eaeg 3-d modeling project: 2nd update." The Leading Edge, 13(9): 949-952, 1994.
E. Anderson. "The dynamics of faulting." Transactions of the Edinburgh Geological Society, 8(3): 387-402, 1905. ISSN 0371-6260. doi: 10.1144/transed.8.3.387.
J. Angelier, A. Tarantola, B. Valette, et S. Manoussis. "Inversion of field data in fault tectonics to obtain the regional stress—I. Single phase fault populations: a new method of computing the stress tensor." Geophysical Journal International, 69(3): 607-621, 1982.
B. Arjang et al. "Pre-mining stresses at some hard rock mines in the Canadian shield." The 30th US Symposium on Rock Mechanics (USRMS), 1989.
A. Auger, N. Hansen, J. M. P. Zerpa, R. Ros, et M. Schoenauer. "Experimental comparisons of derivative free optimization algorithms." SEA, 5526: 3-15, 2009.
C. A. Barton, M. D. Zoback, et K. L. Burns. "In-situ stress orientation and magnitude at the Fenton Geothermal Site, New Mexico, determined from wellbore breakouts." Geophysical Research Letters, 15(5): 467-470, 1988.
T. Belytschko, W. K. Liu, B.Moran, et K. Elkhodary. "Nonlinear finite elements for continua and structures." John wiley & sons, 2000.
J. Berthelon, T. Maurin, M. Conin, B. Leclere, A. Mazuyer, A. Charles, et D. Dhont. "Deciphering second order spatial stress variations from multiple data sources, the case of the Neuquen basin in Argentina." AGU 2017 fall meeting, 2017.
T. D. Blacker et R. J. Meyers. "Seams and wedges in plastering: a 3-D hexahedral mesh generation algorithm." Engineering with computers, 9(2): 83-93, 1993.
F. Bonneau, A. Botella, A. Mazuyer, P. Anquez, B. Chauvin, et G. Caumon. "RINGMesh: An open source platform for Shared Earth Modeling." 80th EAGE Conference and Exhibition 2018, 2018.
M. Bosch, T. Mukerji, et E. F. Gonzalez. "Seismic inversion for reservoir properties combining statistical rock physics and geostatistics: A review." Geo-physics, 2010.
A. Botella. "Génération de maillages non structurés volumiques de modèles géo-logiques pour la simulation de phénomènes physiques." PhD thesis, Université de Lorraine, 2016.
A. Botella, B. Lévy, et G. Caumon. "Indirect unstructured hex-dominant mesh generation using tetrahedra recombination." Computational Geosciences, 20(3): 437-451, 2016.
J. C. Brigham et W. Aquino. "Surrogate-model accelerated random search algorithm for global optimization with applications to inverse material identification." Computer Methods in Applied Mechanics and Engineering, 196(45): 4561-4576, 2007.
M. Brudy, M. Zoback, K. Fuchs, F. Rummel, et J. Baumgärtner. "Estimation of the complete stress tensor to 8 km depth in the ktb scientific drill holes: Implications for crustal strength." Journal of Geophysical Research: Solid Earth, 102(B8): 18453-18475, 1997.
J. Burgers. "Mechanical considerations-model systems-phenomenological theories of relaxation and of viscosity." First report on viscosity and plasticity, Nordemann, New York, 1939.
M. Calvello et R. J. Finno. "Selecting parameters to optimize in model calibration by inverse analysis." Computers and Geotechnics, 31(5): 410-424, 2004.
A. L. B. Cauchy. "Recherches sur l'équilibre et le mouvement intérieur des corps solides ou fluides, élastiques ou non élastiques." 1822.
A. L. B. Cauchy. "Exercices de mathématiques," Anné de Bure Fréres, Paris, 1829.
G. Caumon, G. Gray, C. Antoine, et M.-O. Titeux. "Three-dimensional implicit stratigraphic model building from remote sensing data on tetrahedral meshes: theory and application to a regional model of La Popa Basin, NE Mexico." IEEE Transactions on Geoscience and Remote Sensing, 51 (3): 1613-1621, 2013.
C. Chang, L. C. McNeill, J. C. Moore, W. Lin, M. Conin, et Y. Yamada. "In situ stress state in the nankai accretionary wedge estimated from borehole wall failures." Geochemistry, Geophysics, Geosystems, 11(12), 2010.
B. Chauvin. "Applicability of the mechanics-based restoration: boundary conditions, fault network and comparison with a geometrical method." PhD thesis, Université de Lorraine, 2017.
B. P. Chauvin, P. J. Lovely, J. M. Stockmeyer, A. Plesch, G. Caumon, et J. H. Shaw. "Validating novel boundary conditions for three-dimensional mechanics-based restoration: An extensional sandbox model example." AAPG Bulletin, 102(2): 245-266, 2018.
J. Clark et al. "A hydraulic process for increasing the productivity of wells." Journal of Petroleum Technology, 1(01): 1-8, 1949.

(56) References Cited

OTHER PUBLICATIONS

P. Cobbold et E. Rossello. "Aptian to recent compressional deformation, foothills of the Neuqu'en Basin, Argentina." *Marine and Petroleum Geology*, 20(5): 429-443, 2003.

P. Collon, A. Pichat, C. Kergaravat, A. Botella, G. Caumon, J.-C. Ringenbach, et J.-P. Callot. "3D modeling from outcrop data in a salt tectonic context: Example from the Inceyol minibasin, Sivas Basin, Turkey." *Interpretation*, 4(3): SM17-SM31, 2016.

L. Colmenares et M. Zoback. "A statistical evaluation of intact rock failure criteria constrained by polyaxial test data for five different rocks." *International Journal of Rock Mechanics and Mining Sciences*, 39(6): 695-729, 2002.

M. Conin, P. Henry, V. Godard, et S. Bourlange. "Splay fault slip in a subduction margin, a new model of evolution." *Earth and Planetary Science Letters*, 341: 170-175, 2012.

F. Cornet et B. Valette. "In situ stress determination from hydraulic injection test data." *Journal of Geophysical Research: Solid Earth*, 89(B13): 11527-11537, 1984.

F. H. Cornet. "Elements of crustal geomechanics." *Cambridge University Press*, 2015.

A. Curtis et A. Lomax. "Prior information, sampling distributions, and the curse of dimensionality." *Geophysics*, 66(2): 372-378, 2001.

J. W. Dally et W. F. Riley. "Experimental stress analysis." *McGraw-Hill, New York, NY*, 1965.

P. Davy, C. Darcel, D. Mas Ivars, et R. Le Goc. "Stress fluctuations in fracture networks from theoretical and numerical models." *AGU 2017 fall meeting*, 2017.

M. Diederichs et P. Kaiser. "Tensile strength and abutment relaxation as failure control mechanisms in underground excavations." *International Journal of Rock Mechanics and Mining Sciences*, 36(1): 69-96, 1999.

V. Dobrev, F. Grogan, T. Kolev, R. Rieben, et V. Tomov. "Level set methods for detonation shock dynamics using high-order finite elements." *Technical report, Lawrence Livermore National Laboratory (LLNL), Livermore, CA*, 2017.

V. A. Dobrev, T. V. Kolev, et R. N. Rieben. "High-order curvilinear finite element methods for lagrangian hydrodynamics." *SIAM Journal on Scientific Computing*, 34(5): B606-B641, 2012.

D. C. Drucker et W. Prager. "Soil mechanics and plastic analysis or limit design." *Quarterly of applied mathematics*, 10(2): 157-165, 1952.

A. Etchecopar, G. Vasseur, et M. Daignieres. "An inverse problem in microtectonics for the determination of stress tensors from fault striation analysis." *Journal of Structural Geology*, 3(1): 51-65, 1981.

R. Ewy et N. Cook. "Deformation and fracture around cylindrical openings in rock—i. observations and analysis of deformations." *International Journal of Rock Mechanics and Mining Sciences & Geomechanics Abstracts*, vol. 27, p. 387-407, 1990.

R. Eymard, T. Gallouët, et R. Herbin. "Finite volume methods." *Handbook of numerical analysis*, 7: 713-1018, 2000.

D. Faulkner, T. Mitchell, D. Healy, et M. Heap. "Slip on 'weak' faults by the rotation of regional stress in the fracture damage zone." *Nature*, 444(7121): 922-925, 2006.

K. Fischer et A. Henk. "A workflow for building and calibrating 3-D geomechanical models & a case study for a gas reservoir in the North German Basin." *Solid Earth*, 4(2): 347, 2013.

A. Folguera, G. Bottesi, I. Duddy, F. Martín-González, D. Orts, L. Sagripanti, E. R. Vera, et V. A. Ramos. "Exhumation of the Neuquén Basin in the southern Central Andes (Malargüe fold and thrust belt) from field data and low-temperature thermochronology." *Journal of South American Earth Sciences*, 64: 381-398, 2015.

J. T. Fredrich, D. Coblentz, A. F. Fossum, B. J. Thorne, et al. "Stress perturbations adjacent to salt bodies in the deepwater Gulf of Mexico." *SPE Annual Technical Conference and Exhibition*, 2003.

F. Funicello et S. Lallemand. "Subduction Zone Geodynamics." *Springer*, 2009.

O. Gaede, F. Karpfinger, J. Jocker, et R. Prioul. "Comparison between analytical and 3D finite element solutions for borehole stresses in anisotropic elastic rock." *International Journal of Rock Mechanics and Mining Sciences*, 51: 53-63, 2012.

J. W. Gephart et D. W. Forsyth. "An improved method for determining the regional stress tensor using earthquake focal mechanism data: application to the San Fernando earthquake sequence." *Journal of Geophysical Research: Solid Earth*, 89(B11): 9305-9320, 1984.

T. V. Gerya et D. A. Yuen. "Robust characteristics method for modelling multiphase visco-elasto-plastic thermo-mechanical problems." *Physics of the Earth and Planetary Interiors*, 163(1): 83-105, 2007.

G. Gioda et S. Sakurai. "Back analysis procedures for the interpretation of field measurements in geomechanics." *International Journal for Numerical and Analytical Methods in Geomechanics*, 11 (6): 555-583, 1987.

R. Giot. "Interprétation des mesures de contraintes par relaxation dans les formations argileuses profondes." *PhD thesis, Vandoeuvre-les-Nancy, INPL*, 2004.

D. Grana et E. Della Rossa. "Probabilistic petrophysical-properties estimation integrating statistical rock physics with seismic inversion." *Geophysics*, 2010.

Y. Gunzburger et F. Cornet. "Rheological characterization of a sedimentary formation from a stress profile inversion." *Geophysical Journal International*, 168(1): 402-418, 2007.

C. Guzman, E. Cristallini, et G. Bottesi. "Contemporary stress orientations in the Andean retroarc between 34 S and 39 S from borehole breakout analysis." *Tectonics*, 26(3), 2007.

N. Hansen, S. D. Müller, et P. Koumoutsakos. "Reducing the time complexity of the derandomized evolution strategy with covariance matrix adaptation (CMA-ES)." *Evolutionary computation*, 11(1): 1-18, 2003.

B. S. Hart. "3-D seismic interpretation: A primer for geologists." *SEPM (Society for Sedimentary Geology)*, 2000.

R. Hassani, D. Jongmans, et J. Chéry. "Study of plate deformation and stress in subduction processes using two-dimensional numerical models." *Journal of Geophysical Research: Solid Earth*, 102(B8): 17951-17965, 1997.

D. Healy. "Damage patterns, stress rotations and pore fluid pressures in strikeslip fault zones." *Journal of Geophysical Research: Solid Earth*, 113(B12), 2008.

M. Heidari, M. A. Nikolinakou, M. R. Hudec, et P. B. Flemings. "Geomechanical analysis of a welding salt layer and its effects on adjacent sediments." *Tectonophysics*, 683: 172-181, 2016.

O. Heidbach, M. Rajabi, K. Reiter, et M. Ziegler. "World stress map 2 016." *Science*, 277: pp. 1956-1962, 2016.

T. J. Hughes. The Finite Element Method: Linear Static and Dynamic Finite Element Analysis. Dover Publications, 2000.

A. Hyett, C. Dyke, J. Hudson, et al. "A critical examination of basic concepts associated with the existence and measurement of in situ stress." *ISRM International Symposium*, 1986.

M. J. Ikari, C. Marone, et D. M. Saffer. "On the relation between fault strength and frictional stability." *Geology*, 39(1): 83-86, 2011.

P. Kaiser, S. Yazici, et S. Maloney. "Mining-induced stress change and consequences of stress path on excavation stability—a case study." *International Journal of Rock Mechanics and Mining Sciences*, 38(2): 167-180, 2001.

J. Kennedy et R. Eberhart. "Particle swarm optimization." *Neural Networks, 1995. Proceedings., IEEE International Conference on*, vol. 4, p. 1942-1948 vol.4, 1995. doi: 10.1109/ICNN.1995.488968.

Y.-S. Kim, D. C. Peacock, et D. J. Sanderson. "Fault damage zones." *Journal of structural geology*, 26(3): 503-517, 2004.

S. Kirkpatrick, C. D. Gelatt, M. P. Vecchi, et al. Optimization by simulated annealing, *science*, 220(4598): 671-680, 1983.

E. G. Kirsch. "Die theorie der elastizit t und die bed rfnisse der festigkeitslehre." *Zeitshrift des Vereines deutscher Ingenieure*, 42: 797-807, 1898.

J. Kodama, T. Miyamoto, S. Kawasaki, Y. Fujii, K. Kaneko, et P. Hagan. "Estimation of regional stress state and Young's modulus by back analysis of mining-induced deformation." *International Journal of Rock Mechanics and Mining Sciences*, 63: 1-11, 2013.

K. Kuriyama et Y. Mizuta. "Three-dimensional elastic analysis by the displacement discontinuity method with boundary division into

(56) References Cited

OTHER PUBLICATIONS triangular leaf elements." *International Journal of Rock Mechanics and Mining Sciences & Geomechanics Abstracts*, 30(2): 111-123, 1993.

M. Lamberg, H. Kuula, M. Matinlassi, et al. "Going Deeper in Kemi Mine." *ISRM International Symposium on In-Situ Rock Stress*, 2016.

A. Lehtonen, E. Johansson, et al. "In-situ stresses and large near-surface parking cavern in tampere." *ISRM International Symposium on In-Situ Rock Stress*, 2016.

M. Lejri, F. Maerten, L. Maerten, et R. Soliva. "Paleostress inversion: A multiparametric geomechanical evaluation of the Wallace-Bott assumptions." *Tectonophysics*, 657: 129-143, 2015.

F. Li, J.-a. Wang, et J. C. Brigham. "Inverse calculation of in situ stress in rock mass using the Surrogate-Model Accelerated Random Search Algorithm." *Computers and Geotechnics*, 61: 24-32, 2014.

G. Li, Y. Mizuta, T. Ishida, H. Li, S. Nakama, et T. Sato. "Stress field determination from local stress measurements by numerical modelling." *International Journal of Rock Mechanics and Mining Sciences*, 46(1): 138-147, 2009.

Y. Li, Y. Guo, W. Zhu, S. Li, et H. Zhou. "A modified initial in-situ Stress Inversion Method based on FLAC3D with an engineering application." *Open Geosciences*, 7(1): 824-835, 2015.

W. Lin, M.-L. Doan, J. C. Moore, L. McNeill, T. B. Byrne, T. Ito, D. Saffer, M. Conin, M. Kinoshita, Y. Sanada, et al. "Present-day principal horizontal stress orientations in the Kumano forearc basin of the southwest Japan subduction zone determined from IODP NanTroSEIZE drilling Site C0009." *Geophysical Research Letters*, 37(13), 2010.

A. E. H. Love. "A treatise on the mathematical theory of elasticity, 4th edn." *Cambridge University Press*, 1927.

B. Lund et J. Townend. "Calculating horizontal stress orientations with full or partial knowledge of the tectonic stress tensor." *Geophysical Journal International*, 170(3): 1328-1335, 2007.

A. Madyarov et A. Savitski. "Numerical algorithm for constructing 3D initial stress field matching field measurements." *44th U.S. Rock Mechanics Symposium and 5th U.S.-Canada Rock Mechanics Symposium*, 2010.

F. Maerten et L. Maerten. "Iterative 3D BEM solver on complex faults geometry using angular dislocation approach in heterogeneous, isotropic elastic whole or half-space." *Brebbia, editor, Boundary Elements and other Mesh Reduction Methods*, 30: 201-208, 2008.

F. Maerten, L. Maerten, et D. D. Pollard. "ibem3d, a three-dimensional iterative boundary element method using angular dislocations for modeling geologic structures." *Computers & Geosciences*, 72: 1-17, 2014.

F. Maerten, E. H. Madden, D. D. Pollard, et L. Maerten. :Incorporating fault mechanics into inversions of aftershock data for the regional remote stress, with application to the 1992 landers, california earthquake. *Tectonophysics*, 674: 52-64, 2016a.

L. Maerten, F. Maerten, M. Lejri, et P. Gillespie. "Geomechanical paleostress inversion using fracture data." *Journal of Structural Geology*, 89: 197-213, 2016b.

F. Martin, R. Laviguerie, G. Armand, et al. "Geotechnical feedback of the new galleries excavation at the ANDRA underground research laboratory-Bure (France)." *ISRM International Symposium-EUROCK 2010*, 2010.

L. Mastin. "Effect of borehole deviation on breakout orientations." *Journal of Geophysical Research*, 93(B8): 9187, 1988. ISSN 0148-0227. doi: 10.1029/JB093iB08p09187.

J. Maury, F. H. Cornet, et L. Dorbath. "A review of methods for determining stress fields from earthquakes focal mechanisms ; Application to the Sierentz 1980 seismic crisis (Upper Rhine graben)." *Bulletin de la Société Géologique de France*, 184(4-5): 319-334, 2013.

A. Mazuyer, M. Conin, R. Giot, et P. Cupillard. "Could faults be modelled with elastic materials?" *The Geology of Geomechanics*, 2015.

A. Mazuyer, R. Giot, P. Cupillard, M. Conin, P. Thore, et al. "Stress estimation in reservoirs by a stochastic inverse approach." *ISRM International Symposium on In-Situ Rock Stress*, 2016.

A. Mazuyer, P. Cupillard, R. Giot, P. Thore, M. Conin, et Y. Leroy. "Integrated inverse method to estimate virgin stress state in reservoirs and overburden." *79th EAGE Conference and Exhibition 2017*, 2017.

A. Mazuyer, P. Cupillard, R. Giot, P. Thore, M. Conin, et Y. Leroy. "Stress estimation in reservoirs using an integrated inverse method." *Computers & Geosciences*, 114: 30-40, 2018.

K. I. McKinnon. "Convergence of the Nelder-Mead Simplex Method to a Nonstationary Point." *SIAM Journal on Optimization*, 9(1): 148-158, 1998.

S. McKinnon. "Analysis of stress measurements using a numerical model methodology." *International Journal of Rock Mechanics and Mining Sciences*, 38(5): 699-709, 2001.

S. D. McKinnon et I. G. de la Barra. "Stress field analysis at the El Teniente Mine: evidence for N-S compression in the modern Andes." *Journal of Structural Geology*, 25(12): 2125-2139, 2003.

G. Messager, B. Nivière, J. Martinod, P. Lacan, et J.-P. Xavier. "Geomorphic evidence for Plio-Quaternary compression in the Andean foothills of the southern Neuquén Basin, Argentina." *Tectonics*, 29(4), 2010.

A. J. Michael. "Determination of stress from slip data: faults and folds." *Journal of Geophysical Research: Solid Earth*, 89(B13): 11517-11526, 1984.

R. Milka, Y. Renard, et F. Chouly. "An unbiased Nitsche's formulation of large deformation frictional contact and self-contact." *Computer Methods in Applied Mechanics and Engineering*, 325: 265-288, 2017.

A. Mosquera, V. A. Ramos, et S. Kay. "Intraplate deformation in the Neuquén Embayment." *Special papers—Geological Society of America*, 407: 97, 2006.

J. A. Nelder et R. Mead. "A simplex method for function minimization." *The computer journal*, 7(4): 308-313, 1965.

L. C. Ocola et R. P. Meyer. "Central North American rift system: 1. Structure of the axial zone from seismic and gravimetric data." *Journal of Geophysical Research*, 78(23): 5173-5194, 1973.

J. Pellerin, B. Lévy, G. Caumon, et A. Botella. "Automatic surface remeshing of 3D structural models at specified resolution: A method based on Voronoi diagrams." *Computers & Geosciences*, 62: 103-116, 2014.

J. Pellerin, G. Caumon, C. Julio, P. Mejia-Herrera, et A. Botella. "Elements for measuring the complexity of 3D structural models: Connectivity and geometry." *Computers & Geosciences*, 76: 130-140, 2015.

J. Pellerin, A. Botella, F. Bonneau, A. Mazuyer, B. Chauvin, B. Lévy, et G. Caumon. "RINGMesh: A programming library for developing mesh-based geomodeling applications." *Computers & Geosciences*, 104: 93-100, 2017.

F. Perman, J. Sjöberg, et C. Dahnér. "Detailed three-dimensional stress analysis of complex orebody geometry-model setup and results for the malmberget mine." *Proceedings of Continuum and Distinct Element Numerical Modeling in Geomechanics*, p. 02-04, 2011.

F. Perman, T. Wettainen, G. Corral, J. Sjoberg, et al. "Three-dimensional modeling and stress calibration for a complex mining geometry." *ISRM International Symposium on In-Situ Rock Stress*, 2016.

P. Peska et M. D. Zoback. "Compressive and tensile failure of inclined well bores and determination of in situ stress and rock strength." *Journal of Geophysical Research*, 100(B7): 12791, 1995. ISSN 0148-0227. doi: 10.1029/95JB00319.

D. D. Pollard et R. C. Fletcher. "Fundamentals of structural geology." *Cambridge University Press*, 2005.

J. H. Prevost et N. Sukumar. "Faults simulations for three-dimensional reservoir-geomechanical models with the extended finite element method." *Journal of the Mechanics and Physics of Solids*, 86: 1-18, 2016.

A.-S. Provost et H. Houston. "Orientation of the stress field surrounding the creeping section of the San Andreas fault: Evidence for a narrow mechanically weak fault zone." *Journal of Geophysical Research: Solid Earth*, 106 (B6): 11373-11386, 2001.

(56) References Cited

OTHER PUBLICATIONS

V. A. Ramos. "Las provincias geologicas del territorio argentino." *Geologia Argentina*, 29(3): 41-96, 1999.

V. A. Ramos et A. Folguera. "Andean flat-slab subduction through time." *Geological Society, London, Special Publications*, 327(1): 31-54, 2009.

M. Reberol et B. Levy. "Computing the distance between two finite element solutions defined on different 3D meshes on a GPU." *SIAM Journal on Scientific Computing*, 2017.

L. M. Rios et N. V. Sahinidis. "Derivative-free optimization: A review of algorithms and comparison of software implementations." *Journal of Global Optimization*, 56(3): 1247-1293, 2013. ISSN 09255001. doi: 10.1007/s10898-012-9951-y.

E. Rojas-Vera, J. Mescua, A. Folguera, T. Becker, L. Sagripanti, L. Fennell, D. Orts, et V. A. Ramos. "Evolution of the Chos Malal and Agrio fold and thrust belts, Andes of Neuquen: insights from structural analysis and apatite fission track dating." *Journal of South American Earth Sciences*, 64: 418-433, 2015.

H. Rosenbrock. "An automatic method for finding the greatest or least value of a function." The Computer Journal, 3(3): 175-184, 1960.

M. Salamon. "Elastic moduli of a stratified rock mass." *International Journal of Rock Mechanics and Mining Sciences & Geomechanics Abstracts*, vol. 5, p. 519-527, 1968.

J. Salen,con. "Mecanique des milieux continus: Concepts generaux," vol. 1. *Editions Ecole Polytechnique*, 2005.

D. R. Schmitt, C. A. Currie, et L. Zhang. "Crustal stress determination from boreholes and rock cores: Fundamental principles." *Tectonophysics*, 580: 1-26, 2012.

C. H. Scholz. "Earthquakes and friction laws." *Nature*, 391(6662): 37, 1998.

I. Shames et F. Cozzarelli. "Elastic and Inelastic Stress Analysis." *Prentice-Hall*, 1992.

Z. K. Shipton et P. A. Cowie. "A conceptual model for the origin of fault damage zone structures in high-porosity sandstone." *Journal of Structural Geology*, 25(3): 333-344, 2003.

S. Shnorhokian, H. S. Mitri, et D. Thibodeau. "A methodology for calibrating numerical models with a heterogeneous rockmass." *International Journal of Rock Mechanics and Mining Sciences*, 70: 353-367, 2014.

D. K. Singha et R. Chatterjee. "Geomechanical modeling using finite element method for prediction of in-situ stress in Krishna-Godavari basin, India." *International Journal of Rock Mechanics and Mining Sciences*, 73: 15-27, 2015.

J. Sjoberg et al. "Three-dimensional unit stress tensor modeling of complex orebody geometry." *The 42nd US Rock Mechanics Symposium (USRMS)*, 2008.

G. D. Smith. "Numerical solution of partial differential equations: finite difference methods." *Oxford university press*, 1985.

P. Souloumiac, Y. Leroy, B. Maillot, et K. Krabbenhøft. "Predicting stress distributions in fold-and-thrust belts and accretionary wedges by optimization." *Journal of Geophysical Research: Solid Earth*, 114(B9), 2009.

K. B. Sprague et E. A. De Kemp. "Interpretive tools for 3-D structural geological modelling part II: Surface design from sparse spatial data." *GeoInformatica*, 9(1): 5-32, 2005.

W. D. Stuart et G. M. Mavko. "Earthquake instability on a strike-slip fault." *Journal of Geophysical Research: Solid Earth*, 84(B5): 2153-2160, 1979.

B. Sulistianto, T. Kido, et Y. Mizuta. "Determination of far field stress from the point stress measurement, a numerical approach." *Shigen-to-Sozai*, 114(7): 461-466, 1998.

A. Tarantola. "Inverse problem theory and methods for model parameter estimation". *SIAM*, 2005.

A. Tarantola et B. Valette. "Generalized nonlinear inverse problems solved using the least squares criterion." *Reviews of Geophysics*, 20(2): 219-232, 1982.

S. Tavani, F. Storti, O. Lacombe, A. Corradetti, J. Muñoz, et S. Mazzoli. "A review of deformation pattern templates in foreland basin systems and fold-and-thrust belts: Implications for the state of stress in the frontal regions of thrust wedges." *Earth-Science Reviews*, 141: 82-104, 2015.

P. Thore. "Solving the multimodal problem of 4d seismic to well tying, a comparison of 3 different stochastic algorithms." *SEG Technical Program Expanded Abstracts 2012*, p. 1-5. Society of Exploration Geophysicists, 2012.

S. Timoshenko et J. Goodier. "Theory of Elasticity, International student edition." *McGraw-Hill*, 1970.

J. Tittman et J. Wahl. "The physical foundations of formation density logging (gamma-gamma)." *Geophysics*, 30(2): 284-294, 1965.

A. Torabi et S. S. Berg. "Scaling of fault attributes: A review." *Marine and Petroleum Geology*, 28(8): 1444-1460, 2011.

I. Tsvankin. "Anisotropic parameters and P-wave velocity for orthorhombic media." *Geophysics*, 62(4): 1292-1309, 1997.

G. D. Vergani, A. J. Tankard, H. J. Belotti, et H. J. Welsink. "Tectonic evolution and paleogeography of the Neuquen Basin, Argentina." *AAPG Special Volumes*, 1995.

W. Voigt. "Lehrbuch der kristallphysik, reprint of the 1st edn." *Leipzig: Teubner*, 1928.

M. von Tscharner et S. M. Schmalholz. A 3-D Lagrangian finite element algorithm with remeshing for simulating large-strain hydrodynamic instabilities in power law viscoelastic fluids. Geochemistry, Geophysics, Geosystems, 16 (1): 215-245, 2015. ISSN 15252027. doi: 10.1002/2014GC005628.

A. J. White, M. O. Traugott, et R. E. Swarbrick. "The use of leak-off tests as means of predicting minimum in-situ stress." *Petroleum Geoscience*, 8(2): 189-193, 2002.

D. Wiprut et M. D. Zoback. "Fault reactivation, leakage potential, and hydrocarbon column heights in the northern North Sea." *Norwegian Petroleum Society Special Publications*, 11: 203-219, 2002.

P. Wriggers et T. A. Laursen. "Computational contact mechanics," vol. 2. *Springer*, 2006.

G. Zamora-Valcarce. "Estructura y Cinematica de la faja plegada del Agrio, Cuenca Neuquina." *PhD thesis, Ph. D. thesis, University of Buenos Aires*, 2007.

T. Zapata et A. Folguera. "Tectonic evolution of the Andean fold and thrust belt of the southern Neuquen Basin, Argentina." *Geological Society, London, Special Publications*, 252(1): 37-56, 2005.

L. Zhang, Z. Yue, Z. Yang, J. Qi, et F. Liu. "A displacement-based back-analysis method for rock mass modulus and horizontal in situ stress in tunneling-illustrated with a case study." *Tunnelling and Underground Space Technology*, 21(6): 636-649, 2006.

S. Zhou. "A program to model the initial shape and extent of borehole breakout." *Computers & Geosciences*, 20(7-8): 1143-1160, 1994.

O. C. Zienkiewicz et R. L. Taylor. "The finite element method," vol. 3. *McGrawhill London*, 1977.

M. Zoback, C. Barton, M. Brudy, D. Castillo, T. Finkbeiner, B. Grollimund, D. Moos, P. Peska, C. Ward, et D. Wiprut. "Determination of stress orientation and magnitude in deep wells." *International Journal of Rock Mechanics and Mining Sciences*, 40(7): 1049-1076, 2003.

M. D. Zoback. "Reservoir geomechanics." *Cambridge University Press*, 2007.

M. D. Zoback, M. L. Zoback, V. S. Mount, J. Suppe, J. P. Eaton, J. H. Healy, D. Oppenheimer, P. Reasenberg, L. Jones, C. B. Raleigh, et al. "New evidence on the state of stress of the San Andreas fault system." *Science*, 238(4830): 1105-1111, 1987.

C. Zoccarato, D. Baú, F. Bottazzi, M. Ferronato, G. Gambolati, S. Mantica, et P. Teatini. "On the importance of the heterogeneity assumption in the characterization of reservoir geomechanical properties." *Geophysical Journal International*, 207(1): 47-58, 2016.

* cited by examiner

ESTIMATING IN SITU STRESS FIELD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to in situ stress field estimation, and more particularly to a computer-implemented method, a computer program and a computer system for estimating in situ stress field of a geological environment. An application of the invention lies in oil and/or gas production.

Description of the Related Art

Estimating in situ (i.e. currently applying) stress field of a geological environment (e.g. a subsoil) may have many applications, such as in the civil engineering, the petroleum or the mining industry. For instance, tunneling requires retaining structures that are sized depending on the stress field variation in the surrounding rocks due to the excavation. Also, during oil and/or gas extraction, the depletion disturbs the mechanical equilibrium yielding a stress change in the reservoir and the overlying geological layers (the overburden). This can have unexpected consequences such as borehole instabilities and unexpected oil and gas leaks or migration, which is why in situ stress field should rather be monitored.

Computer-implemented methods are known for estimating in situ stress field.

Numerous methods consist in inferring stress field based on measurements of a geological attribute from which a stress-related attribute may be derived. These methods comprise performing the measurements in situ at different positions of the geological environment and extrapolating the measurements based on physical laws, so as to obtain a stress field.

Due to the sparsity of the measurements, the extrapolation may be difficult or not always possible, and lead in many cases to a relatively inaccurate result (i.e. inaccurately representative of in situ stress field).

Other methods estimate in situ stress field with a geomechanical simulator, based on a geomechanical model representing the geological environment (i.e. geomodeling the geological environment). The geomechanical model may be established for example based on geological knowledge. These methods comprise defining on the geomechanical model a boundary condition set (i.e. a set of one or more boundary conditions, e.g. also referred to as "virgin stress"). These methods then comprise running the geomechanical simulator on the designed geomechanical model with the defined boundary condition set. These methods may then derive from the output data a stress field distributed on the geological environment, representative of the actual stress field to which the geological environment is currently subject. Such determined stress field is a relatively accurate estimation of in situ stress field, provided that the boundary condition set is well-defined.

Defining the boundary condition set manually may be a tedious task. For a given geomechanical model of the earth, the relative stress variation during the life of the field (assuming linear elasticity) can be computed using change of the pressure inside the reservoir provided by flow simulation and well measurements. The absolute stress is harder to access since direct measurements are parsimonious. When computing absolute stress, the initialization phase of the model to find the virgin stress is extremely sensitive and relatively hazardous. It may consist in calculating boundary conditions (e.g. stress or displacement) on the faces surrounding the geomechanical model. The quality of these boundary conditions relies on the man of the art who checks various parameters (e.g. constraint at the well or stress orientation) depending on the available data and local current practice. Thus, the boundary condition set obtained may often lead to a relatively inaccurate result outputted by the geomechanical simulator.

For this reason, techniques were developed to state the problem of defining the boundary condition set as an inverse problem. Such techniques are presented for example in the following paper: *Stress estimation in reservoirs using an integrated inverse method*, Mazuyer, A., Cupillard, P., Giot, R., Conin, M., Leroy, Y. and Thore, P., *Computers & Geosciences*, 2018. In these techniques, measurements of a geological attribute performed in the geological environment are used to define the boundary condition set. Specifically, the techniques may try to find the boundary condition set that minimizes the difference between such data measured at given positions and simulated measures at the same positions. The parameterization of the boundary conditions can be of various forms. But the techniques do not intend to retrieve the "true" boundary condition set (which are the result of complex geological process through the ages), rather a boundary condition set that provides a reasonable stress field as close as possible to the true stress field at least at data points. It should be understood that even with this approach, the estimated virgin stress is still highly uncertain due to sparsity of data.

In this context, there is still a need for an improved solution for estimating in situ stress field of a geological environment.

SUMMARY OF THE INVENTION

It is therefore provided a computer-implemented method for estimating in situ stress field of a geological environment. The method comprises providing a geomechanical model of the geological environment, measurements of a first geological attribute each performed at a respective first position of the geological environment, constraints on a second geological attribute related to a yield criterion and each assigned to a respective second position of the geological environment, and a geomechanical simulator. The geomechanical simulator is configured to take as input the geomechanical model and a set of one or more boundary conditions defined on the geomechanical model, and to output data. The output data are data from which different other data are derivable. These other data comprise values of the first geological attribute each at a respective first position, values of the second geological attribute each at a respective second position, and a stress field distributed on the geological environment. The method also comprises determining the stress field derivable from the data outputted by the geomechanical simulator taking as input the geomechanical model and an optimal set of one or more boundary conditions. The optimal set optimizes a program rewarding for each respective one of candidate sets of one or more boundary conditions consistency between the measurements and the values of the first geological attribute, and respect of the constraints by the values of the second geological attribute.

Such a method forms an improved solution to estimate in situ stress field.

The method offers capabilities of well-known methods that rely on a geomechanical simulator configured to process a geomechanical model of the geological environment, so as to output data from which a stress field distributed on the geological environment is derivable.

Thanks to considering an optimal boundary condition set (among candidate boundary condition sets) with respect to an optimization program, the method does not require and may exclude at least fully manual setting of the boundary condition set inputted to the geomechanical simulator. In particular, the method may be performed with an at least partially automatic determination of such boundary condition set. Such determination may be performed accurately (i.e. eventually leading to a relatively accurate stress field) thanks to the existence and use of the measurements and to the optimization program taking said measurements into account, namely by rewarding consistency between the measurements and the output of the geomechanical simulator. In other words, the method states the problem of defining the boundary condition set as an inverse problem.

Now, the optimization program further takes into account provided constraints, namely by rewarding respect of the constraints by the output of the geomechanical simulator. The constraints may be representative of predetermined geomechanical knowledge on the geological environment. The method thereby provides a means of increasing the predictability of geomechanical simulation by introducing new data/hypothesis in the definition of in situ stress. The introduction of constraints provides a means of reducing the uncertainty due to the sparsity of mechanical data within the inverse approach framework. The method thus yields a more accurate in situ stress field. Moreover, since the constraints are related to a yield criterion, the constraints are simple to postulate and/or reliable, thus making the framework proposed by the method robust.

Additionally or alternatively to determining the stress field derivable from the data outputted by the processing of the geomechanical model by the geomechanical simulator with the optimal boundary condition set and/or outputting (e.g. storing in a database and/or sending to a distant computer system) said estimated stress field, the method may comprise determining and/or outputting (e.g. storing in a database and/or sending to a distant computer system) said optimal boundary condition set itself. This allows for example later modifying the geomechanical model and applying the geomechanical simulator with this already available (and provided) optimal boundary condition set to estimate the stress field, thereby saving time relative to re-determining a boundary condition set.

In examples, the method may present any one or more of the following:
- one or more constraints are that the yield criterion be not reached and/or one or more constraints are that the yield criterion be reached;
- determining the stress field comprises minimizing a cost function, and the cost function includes a first term that penalizes, for each respective first position, a distance between the measurement and the value of the first geological attribute, and a second term that penalizes, for each respective second position, an extent of not respecting the constraint by the value of the second geological attribute;
- minimizing the cost function is performed with a Covariance Matrix Adaptation Evolution Strategy (CMA-ES);
- the second term comprises a sum of second penalties, each second penalty consisting of a transfer function applied to the extent of not respecting the constraint by the value of the second geological attribute;
- the transfer function is a sigmoid varying from 0 to a positive number;
- the yield criterion is the Drucker Prager criterion;
- the geological environment is a subsoil subject to extraction and/or injection, for example a subsoil subject to oil and/or gas production;
- determining the stress field is performed during or after well drilling, oil and/or gas extraction, or hydraulic fracturing, or before well drilling, oil and/or gas extraction, or hydraulic fracturing;
- the first positions are located at one or more wells; and/or
- the second positions substantially cover the subsoil, or one or more regions of the subsoil surrounding a well and/or a fault.

It is further provided a computer program comprising instructions for performing the method.

It is further provided a data storage medium having recorded thereon the computer program.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE PREFERRED EMBODIMENT

Figure 1:
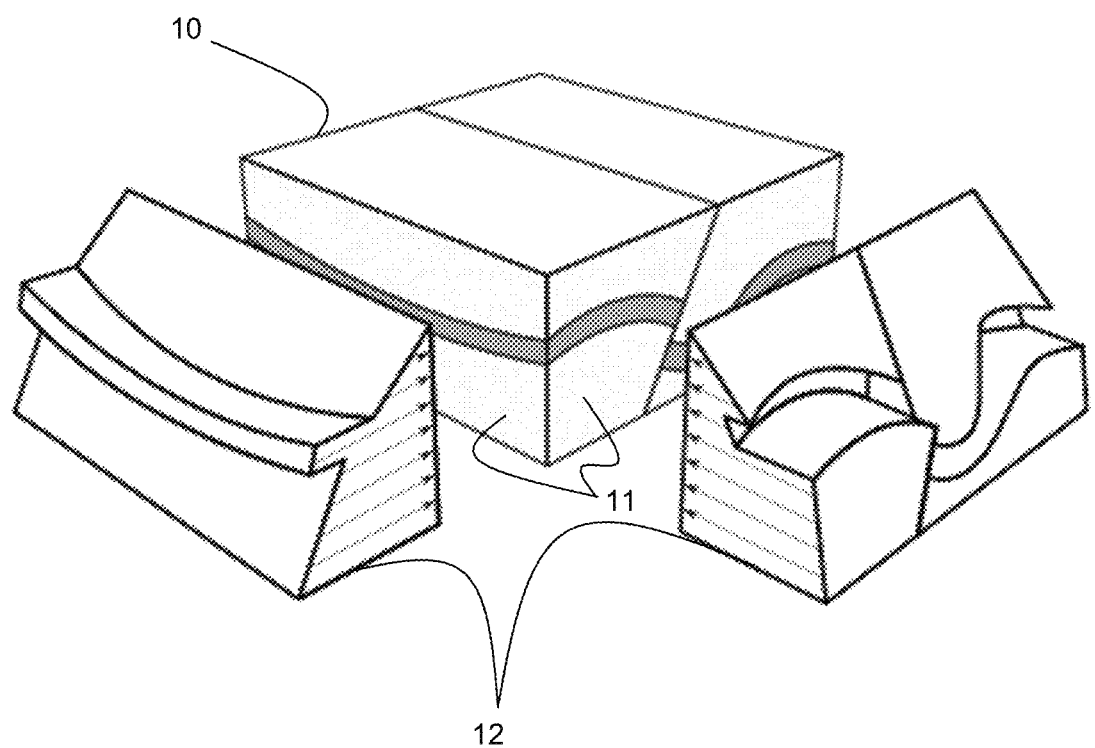
FIG. 1 shows an example of geomechanical simulator input.

The expression "stress field distributed on the geological environment" designates any spatial distribution of a stress-related attribute, that is, an attribute related to a stress state (i.e. a physical value homogeneous to a pressure) on the geological environment. The stress state may for example be defined as a symmetric 2nd-order tensor, also called "stress tensor" (such as the Cauchy stress tensor) and often noted in the art:

$$\sigma = \begin{pmatrix} \sigma_{xx} & \sigma_{xy} & \sigma_{xz} \\ & \sigma_{yy} & \sigma_{yz} \\ & & \sigma_{zz} \end{pmatrix}$$

The stress-related attribute may be the full stress state defined by the Cauchy stress tensor, one or more coordinates thereof, or any data from which such a stress state or coordinate(s) thereof can be derived. The stress-related attribute may, for example, comprise the principal stress magnitudes and orientations, which are obtained using the eigen values and the eigen vectors of the matrix presented above.

The expression "estimating in situ stress field of a geological environment" refers to the action of determining such a distribution representative of the current stress situation of the geological environment (i.e. without simply performing measurements of the stress-related attribute(s) everywhere and outputting the result, e.g. when a measurement of at least of the whole distribution is not available). The method performs such estimation when determining the stress field derivable from the data outputted by the geomechanical simulator, when inputting to the geomechanical simulator the geomechanical model with the optimal boundary condition set.

The geological environment comprises geological structures. A geological structure is a formation in the geological environment that is of interest to any geological phenomenon that may occur in the geological environment. A geological structure may be a reservoir, a horizon, an unconformity, an intrusion, a channel, a salt diapirism, a fold, a fault or yet a zone of steam presence or a front surface thereof in a steam-assisted gravity drainage (SAGD) situation.

A geomechanical model of a geological environment is, as known per se from the field of geomodeling, a data structure that represents geometry of geological structures constitutive of the geological environment and geomechanical properties of said geological structures.

The geomechanical model of the method may be predetermined and/or retrieved e.g. in a database, or alternatively received e.g. from a distant computer system. Alternatively, the method may comprise at least partly designing the geomechanical model, for example based on geological information relative to the geological environment.

The geomechanical model may comprise a structural model, which is as known per se a data structure representative of geometry of the geological structures constitutive of the geological environment. The structural model may comprise a surface structural model (i.e. comprising surfaces representing boundaries of the geological structures), and/or a meshed structural model (i.e. comprising cells—e.g. tetrahedra-conforming to the boundaries of the geological structures). A meshed structural model may be derived from a surface structural model, for example by gridding the surface structural model.

The geomechanical model may further comprise data assigned to geometrical structures (e.g. surfaces and/or cells) of the structural model and that represent geomechanical properties of the corresponding geological structures, for example a distribution of geomechanical parameter values, e.g. each value being assigned to a respective cell of the meshed structural model or to a respective surface portion of the surface structural model. The geomechanical properties may comprise rock properties. The rock properties may comprise rock density (often noted p in the art) and/or one or more elastic behavior parameters (or elastic moduli), such as the Young modulus (often noted E in the art) and/or the Poisson coefficient (often noted v in the art).

A geomechanical simulator is, as known per se from the field of geomechanics, a software module configured to take as an input a geomechanical model and a set of one or more boundary conditions (also referred to as "boundary condition set") defined on the geomechanical model, and to process such input (e.g. using Finite Element Analysis) so as to output data related to the geomechanical situation of the geological environment represented by the geomechanical model. The processing is often referred to as "forward modeling" in the art.

The geomechanical simulator of the method may be predetermined and/or retrieved e.g. in a database, or received e.g. from a distant computer system. Alternatively, the method may comprise at least partly developing/coding the geomechanical simulator.

The geomechanical simulator is in any case configured to process the geomechanical model of the method. In other words, the data format of the geomechanical simulator and the data format of the geomechanical model are compatible.

The processing of the geomechanical model by the geomechanical simulator requires, as known per se from the field of geomechanics, a boundary condition set to be defined on the geomechanical model. Boundary conditions are geomechanical information relative to boundaries of the geomechanical model, for example relative to outer/peripheral faces of the structural model. The geomechanical simulator may be configured to process the geomechanical model with any one or more types of boundary conditions defined thereon. The boundary condition set may comprise values of forces or stress exerted on boundaries of the geomechanical model, i.e. stress boundary conditions, also called "Neumann" boundary conditions. The Neumann boundary conditions are a type of boundary conditions known per se from the field of geomechanics, discussed in the following paper: *Numerical algorithm for constructing 3D initial stress field matching field measurements*, A. Madyarov et A. Savitski, 44*th U.S. Rock Mechanics Symposium and 5th U.S.-Canada Rock Mechanics Symposium,* 2010. The boundary condition set may additionally or alternatively comprise values of displacement of boundaries of the geomechanical model, i.e. displacement boundary conditions, also called "Dirichlet" boundary conditions.

FIG. 1 represents an example of data that may be inputted to the geomechanical simulator. The input data comprise surface structural model 10 and boundary conditions (Neumann) 12 defined on two consecutive lateral faces 11 of the surface structural model 10 (as a 2D distribution of forces, as shown by the arrows on the figure, e.g. represented for example by piecewise continuous functions). Potential geomechanical properties and/or underlying gridding of the surface structural model 10 are not represented on the figure. Displacement (Dirichlet) boundary conditions may be fixed to zero (i.e. no displacement of the faces of the surface structural model 10 allowed).

The output data of the geomechanical simulator of the method may be any data from which certain information relative to the geological environment is derivable. By "derivable", it is meant that the information can be derived (i.e. obtained or determined) easily and directly from the output data, possibly using a computation and/or other information of the geomechanical model, for example using mechanical behavior laws, e.g. with an algorithmic complexity in O(1).

The information includes a stress field distributed on the geological environment. In examples, the output data of the geomechanical simulator may already consist of or comprise said stress field (the derivation being in such a case straightforward, the "information derived from the output data" being the output data themselves or a portion thereof).

In tested implementations of the method, surface structural models were generated with SKUA-GOCAD™ and meshed using VorteXLib™, in general line with PhD thesis *Génération de maillages non structurés volumiques de modèles géologiques pour la simulation de phénomènes physiques*, A. Botella, Université de Lorraine, 2016, and paper *Indirect unstructured hex-dominant mesh generation using tetrahedra recombination*, A. Botella, B. Lévy, and G.

Caumon, *Computational Geosciences*, 20(3): 437-451, 2016. The geomechanical simulator was configured to output stress computation using Finite Element Analysis, and it was developed in RINGMecha. Other software frameworks may however be used by the method, such as Visage™ or Abaqus™ which provide well-known geomechanical simulators.

The method does not require and may thus exclude manually defining one or more (e.g. all) of the boundary condition(s) of the boundary condition set on the geomechanical model for the geomechanical simulator to process the geomechanical model. The method instead comprises determining the stress field derivable from the data outputted by the geomechanical simulator taking as input the geomechanical model and an optimal boundary condition set. The optimal set is not defined manually (at least fully) but rather forms a boundary condition set selected automatically (at least partially) among candidate boundary condition sets so as to optimize an (optimization) program. In other words, the determining of the stress field may comprise or consist in (e.g. automatically) solving an optimization program involving the cost function and where the argument (or "free variable") is the boundary condition set (that is to be inputted to the geomechanical simulator together with the predetermined geomechanical model on which the boundary condition set is to be defined), and where the argument can evolve within a certain domain (consisting of all the candidate sets). The method is thereby said to perform "inversion" of at least part of the boundary condition set (i.e. at least some of the boundary conditions).

The domain of candidate boundary condition sets may be predetermined and/or included in the group of all boundary condition sets that may be inputted to the geomechanical simulator for the geomechanical model. In examples, the structural model of the geomechanical model presents a polygonal shape generally representing a portion of a geological (e.g. subsoil) slice with substantially horizontal faces and substantially non-horizontal faces, for example a general prism (e.g. cubic) shape with two (bottom and top) substantially horizontal faces and a number (e.g. in the cubic case, four) substantially vertical lateral faces. Structural model 10 of FIG. 1 is an example of such a cubic shape. In such examples, the group may consist of all boundary condition sets comprising, defined on each face, a respective stress (Neumann) boundary condition or a respective displacement (Dirichlet) boundary condition. The domain of candidate boundary condition sets may be defined as a restriction of this group where all displacement boundary conditions are predetermined and/or fixed to zero (in other words, the displacement boundary conditions are not inverted by the method). The group may be further restricted by predetermining and/or fixing to zero stress boundary conditions defined on (e.g. substantially horizontal) top face. This simplifies the computations. The group may be further restricted by limiting ranges of values within which parameters of boundary conditions not fixed to zero are allowed to vary in the optimization.

The domain resulting from such restriction of the group constitutes a space where at least part of the boundary conditions (i.e. those not fixed to zero) are free to vary so to optimize the program. The program may be a predetermined optimization program. These unfixed (e.g. Neumann) boundary conditions may be said to be inverted by the method. In the case of a cubic structural model (e.g. such structural model 10 of FIG. 1), the only inverted boundary conditions may in examples be stress (Neumann) boundary conditions defined on two consecutive vertical faces of the model (such as boundary conditions 11 of FIG. 1), the other boundary conditions to be inputted to the geomechanical simulator being predetermined and/or fixed to zero.

In order to invert the boundary condition(s) authorized to freely vary in the optimization, the method makes use of two types of provided data: the measurements and the constraints. In specific, the optimization program rewards selecting a boundary condition set among the candidate sets which leads to output data that tend to be consistent with the measurements. This is similar to the inversion technique presented in the following earlier-cited paper: *Stress estimation in reservoirs using an integrated inverse method*, Mazuyer, A., Cupillard, P., Giot, R., Conin, M., Leroy, Y. and Thore, P., *Computers & Geosciences*, 2018. The method adds to this technique also providing the constraints and having the optimization program reward selecting a boundary condition set among the candidate sets which leads to output data that tend to respect (i.e. meet/fulfill) the constraints.

For a respective candidate boundary condition set, rewarding consistency with the measurements (also referred to as "data points") is enabled, by the measurements each being a respective value of a first geological attribute at a respective first position of the geological environment, and by the geomechanical model outputting data from which comparable data may be derived for said first positions, namely values of the first geological attribute (also referred to as "(first) simulated values/computed data"). Similarly, rewarding respect the constraints is enabled, by the constraints each involving a respective value of a second geological attribute at a respective second position of the geological environment, and by the geomechanical model outputting data from which data allowing assessment respect of the constraint may be derived for said second positions, namely values of the second geological attribute (also referred to as "(second) simulated values/data"). The optimization program may perform the rewarding in any way.

Thus, the information relative to the geological environment and derivable from the output data of the geomechanical simulator also include values of the first geological attribute and values of the second geological attribute. Now, the first geological attribute is any geological attribute corresponding to and represented by the performed measurements. Similarly, the second geological attribute is any data corresponding to the yield criterion and comparable to the yield criterion such that respect of a constraint related to the yield criterion can be assessed.

The first and second geological attribute may be any physical attributes related to geological information. In examples, the first geological attribute and the second geological attribute may be distinct attributes. In alternative examples, the first geological attribute and the second geological attribute may be identical attributes. Indeed, the first geological attribute and the second geological attribute are not necessarily different, since the method may provide constraints related to a yield criterion and defined on the first geological attribute, provided that the first geological attribute be one that may compare to the yield criterion. In examples, the first geological attribute and/or the second geological attribute is a stress-related attribute, for example the same stress-related attribute of the stress field derivable from the output data of the geomechanical simulator, or one or more coordinates thereof. In such examples, the output data of the geomechanical simulator may consist in the stress field, and the derivations of first and second geological attributes is straightforward. It should also be understood that the method may also comprise providing and involving in the determining of the stress field: measurements of one or more other geological attributes (than the first geological attribute) and/or constraints on one or more other geological attributes (than the second geological attribute) and/or related to one or more another criteria (than the yield criterion, e.g. other yield criteria and/or non-yield criteria). In the examples of the method provided later, the simple case of the first and second geological attribute being the attribute of the stress field outputted by the geomechanical simulator will often be referred to, for the sake of keeping the discussion and the notations concise.

The method may comprise setting the constraints. In any case, the constraints may be set in any way and/or at any second positions. The second geological attribute may be any attribute for which values at the second positions are derivable from the output data of the geomechanical simulator. The constraints may derive from any available information and/or observation corresponding to such a second geological attribute. The information and/or observation may be predetermined and/or derived from knowledge on the geological environment.

The constraints are related to a yield criterion, which may be predetermined to the method. A yield criterion is a mechanical threshold on a geological attribute (e.g. a stress state or a derivative thereof) such that, when it is reached at a respective position, yielding occurs in the geological environment at the respective position. As known per se, different yield criteria may be defined and correspondingly the second geological attribute may be of a different type depending on the retained yield criterion.

The threshold can for example be set using various theories such as Mohr-Coulomb, Von Mises or Drucker Prager. In examples, the yield criterion of the method may be the Drucker Prager criterion (i.e. the threshold is set using the Drucker Prager theory). Such examples of the method are not too complex in implementation, yet not too simplistic from the geological standpoint.

The second geological attribute may in many cases be a derivative of a stress state at a second position. It should be understood that for a given well-known yield criterion, the corresponding geological attribute is also well-known.

In examples, one or more (e.g. all) of the constraints may be that the yield criterion be not reached. In other words, the method integrates the hypothesis that at certain positions (i.e. the second positions), yielding does not occur. Thus, the method rewards the geomechanical simulator selecting boundary conditions so as to output data respecting such non-yielding constraint.

Alternatively or additionally, one or more (e.g. all) of the constraints may be that the yield criterion be reached. In other words, the method integrates the hypothesis that at certain positions (i.e. the second positions), yielding occurs. Thus, the method rewards the geomechanical simulator selecting boundary conditions so as to output data respecting such yielding constraint.

Such constraints may often be easy to provide to the method.

The method may for example be performed in a situation where it is known that there is currently no yielding occurring in the geological environment. In such a situation, the set of second positions may substantially cover the subsoil, e.g. comprise all positions of the geological environment (i.e. the constraints are set at all positions of the geological environment, e.g. represented in the geomechanical model).

Additionally or alternatively, the geological environment may comprise at least one fault. In such a case, the method may be performed in a situation where it is known that the fault is not being reactivated or on the contrary is being reactivated. In such a situation, the set of second positions may comprise all positions of the fault.

Additionally or alternatively, geological knowledge can be used: e.g. layers with the more brittle behavior can be defined as regions where yielding is the most possible.

Additionally or alternatively, the geological environment may be a subsoil subject to extraction and/or injection (for example a subsoil subject to oil and/or gas production), and/or which comprises one or more wells (or wellbores). In such a case, it can be postulated that no yielding occurs or alternatively that yielding occurs in one or more regions of the subsoil surrounding a well, e.g. and for which all positions are below a predetermined distance threshold from the well. On the wells there are information coming through fluid circulation and therefore it may be known more or less accurately if the wells have collapsed or not and therefore if yielding occurs or not.

More generally, in any situation where information related to the current yielding situation is available in addition to the measurements (and this is often the case when it comes to yielding information), the method may be implemented. Constraints may indeed be derived from such corresponding predetermined yielding information and used when inverting the boundary conditions, so as to improve such inversion.

The method may comprise performing the measurements. In any case, the measurements may be performed in any way and/or at any first positions. The first geological attribute may be any attribute for which values at the first positions are derivable from the output data of the geomechanical simulator. The measurements may be any available measured data corresponding to such a first geological attribute. The measurements may involve one or more devices capturing a measure. The devices may include sensors. The term "measurements" designates any observed real data, as opposed to "simulations".

Many ways for performing measurements providable by the method are known from the prior art. The measured data can be of various type (e.g. stress, displacement, or pressure) as long as the Geomechanical simulator (the forward problem) can model them.

The measurements may for example be performed according to the earlier-cited techniques to state the problem of defining the boundary condition set as an inverse problem. The measurements may be performed as known from methods for inferring stress field based on measurements of a geological attribute. Examples are provided in the following papers:

*Reservoir geomechanics*, M. D. Zoback, Cambridge University Press, 2007;

*A comparison of leak-off test and extended leak-off test data for stress estimation*, M. Addis, T. Hanssen, N. Yassir, D. Willoughby, J. Enever, et al, *InSPE/ISRM Rock Mechanics in Petroleum Engineering*, 1998; and/or

*Interprétation des mesures de contraintes par relaxation dans les formations argileuses profondes*, R. Giot, PhD thesis, Vandoeuvre-les-Nancy, INPL, 2004, which provides a review of different techniques.

In examples, the geological environment may be a subsoil subject to extraction and/or injection (for example a subsoil subject to oil and/or gas production), which comprises one or more wells. In such a case, the first positions may be located at one or more wells, for example along the wells. It is indeed known that measurements can be obtained at wells, for example using techniques described in the above-cited papers. For example, hydraulic fracturing, which consists in injecting water in borehole, may lead to an estimation of the least principal stress σ3. Alternatively or additionally, stress information may be obtained with well imaging techniques (such as ovalization observations, e.g. based on ultrasounds or other data). These techniques give information on the stress orientation.

Determining the stress field may serve any one or more of any plurality of purposes.

For example, determining the stress field may be performed during action on the subsoil, such as well drilling, oil and/or gas extraction, and/or hydraulic fracturing. In such a case, the estimated in situ stress field may be based upon to evaluate the impact of such action on the subsoil. A decision to continue, modify and/or stop the action may then be made based on said evaluated impact.

Determining the stress field may alternatively or additionally be performed after such action. In such a case, the estimated in situ stress field may again be based upon to evaluate the impact of such action on the subsoil. A decision to repeat or not the action or to start or not another action on the subsoil may then be made based on said evaluated impact.

Determining the stress field may alternatively or additionally be performed before action on the subsoil, such as well drilling, oil and/or gas extraction, or hydraulic fracturing. In such a case, a decision to perform the action may be made based on the estimated in situ stress field.

The method may notably help avoid or reduce accidents, recognize faults e.g. so as to enhance production, and/or avoid aquifers. One goal of the method may be to find a 3D virgin stress in a whole reservoir and overburden before the exploitation and the depletion. The method may help in the petroleum industry to prevent wellbore failure and fault reactivation.

The optimization program may be predetermined and present any form. The optimization program may in examples consist in minimizing a cost function.

Example implementations of the method are now discussed where the constraints are that the yield criterion be not reached. Adaptation to other constraints related to the yield criterion, such that the yield criterion be reached, is straightforward.

As mentioned above, a main problem with estimated virgin stress even with an inverse problem approach is the lack of data. Many different solutions can match with the same accuracy the data points providing many different interpretations regarding the mechanical behavior of a field, especially in areas where no observation data are available. The method at least partially overcomes this difficulty by introducing a new type of data that are accessible or that can be induced to constrain the calculation of virgin stress. Schematically, the behavior of a rock can be divided in two parts: the elastic behavior which responds to a stress with a (reversible) deformation of the rock, and the failure part which starts when the stress field applied to a rock overcomes a certain threshold. The method proposes to use this type of constraint to limit the range of possible stress fields and to transform the inverse problem into an inverse problem under constraint.

The original cost function of the prior art can be written as:

$$J(\text{model, limit}) = \sum_{Nd} (D_i - md_i)^2 \quad (1)$$

where Nd is the number of data points $D_i$ the data points (e.g. vertical or horizontal stress measured in well(s)) and $md_i$ the computed data at the same positions using the geomechanical model and geomechanical simulator. The functional J is dependent on the geomechanical model and the limit (i.e. boundary) conditions.

Using the new approach proposed by the method, equation (1) may transform into:

$$J(\text{model, limit}) = \sum_{Nd} (D_i - md_i)^2 \quad (2)$$

under constraint that $\forall j \in \Omega$: $md_j$ is such that yield_criterion is respected where $\Omega$ is the ensemble of points where the method pre-knows that the yield criterion should be respected ($\Omega$ can be the whole model or just a subset of it). The optimization may now be performed under the constraint of respecting the yield criterion.

Due to the physics of the problem, the method may avoid use of classical gradient-based and/or Lagrange multipliers techniques to solve equation (2).

Rather, determining the stress field may comprise minimizing the cost function, where the minimization may be unconstrained. Indeed, the cost function may include a first term that penalizes, for each respective first position, a distance between the measurement and the value of the first geological attribute. This captures and penalizes mismatch/inconsistency between the simulated first values and the data points. The cost function may also include a second term that penalizes, for each respective second position, an extent of not respecting the constraint by the value of the second geological attribute (e.g. such extent being a distance—e.g. Euclidian—between the value of the second geological attribute and the portion of the domain of the second geological attribute where the constraint is respected). This captures non-respect, by the simulated second values, of the constraints stemming from predetermined geological knowledge. As can be seen, with such a cost function the constraints are integrated in the cost function to be minimized rather than left as an optimization constraint (such as shown by equation (2)). This allows computationally efficient minimizing of the cost function, using any predetermined minimization scheme configured for unconstrained problems.

A particularly efficient technique used in implementations of the method to minimize the cost function is a derivative-free approach called Covariance Matrix Adaptation Evolution Strategy (CMA-ES), and for example described in the following paper: *Reducing the time complexity of the derandomized evolution strategy with covariance matrix adaptation(CMA-ES)*, N. Hansen, S. D. Müller, et P. Koumoutsakos, Evolutionary computation, 11(1): 1{18, 2003. But other approaches may be used, such as Ensemble methods, Genetic Algorithms, Simulated Annealing, or any other evolutionary approach.

In particular efficient examples, the cost function may be written as:

$$J(\text{model, limit}) = \sum_{Nd} (D_i - md_i)^2 + \sum_{\Omega} s(Y(\omega), \text{yield\_criterion}) \quad (3)$$

where Y represents the simulated second value (the second geological data corresponding to the yield criterion) at the point ω and s a transfer function (e.g. having a sigmoidal form or "sigmoid", such as for example the logistic function or the arctan function) that transforms the extent of non-respect of the constraint into a penalty e.g. zero when Y<yield_criterion and a positive (e.g. large) value whenever Y reaches or overcomes yield_criterion (i.e. the threshold defined by the yield criterion theory used).

In other words, in these examples the second term thus comprises a sum of second penalties, each second penalty consisting of a transfer function applied to the extent of reaching the yield criterion by the value of the second geological attribute, the transfer function being a sigmoid varying from 0 to a (e.g. predetermined) positive number and reaching the positive number when the yield criterion is reached.

The sigmoid function presents a shape well-suited to integrate the constraints in the cost function so as to lead to accurate results, thanks to its relatively little penalizing small values (since the S-shape starts flat). The continuity of the sigmoid function also allows for a relatively fast and robust convergence of the minimization.

Also, in these examples the first term comprises a sum of first penalties, each first penalty consisting of the square of the distance between a stress measurement and the value of the first geological attribute (being noted that other types of first penalties may be implemented than ones using a square), and wherein the distance between a stress measurement and the value of the first geological attribute is represented by the difference between the stress measurement and the value of the first geological attribute (being noted that other types of distance may be implemented than ones using the difference).

In specific implementations, the extent of reaching the yield criterion by the value of the second geological attribute may be represented by the ratio of the yield criterion over the value of the second geological attribute.

Figure 2:
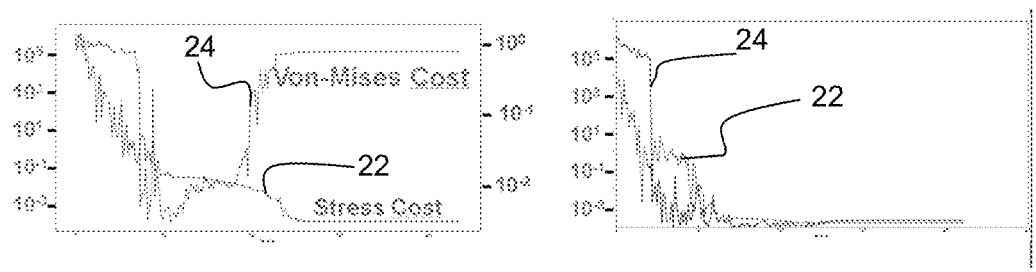
FIGS. 2-3 illustrate tested implementations of the method.
Figure 3:
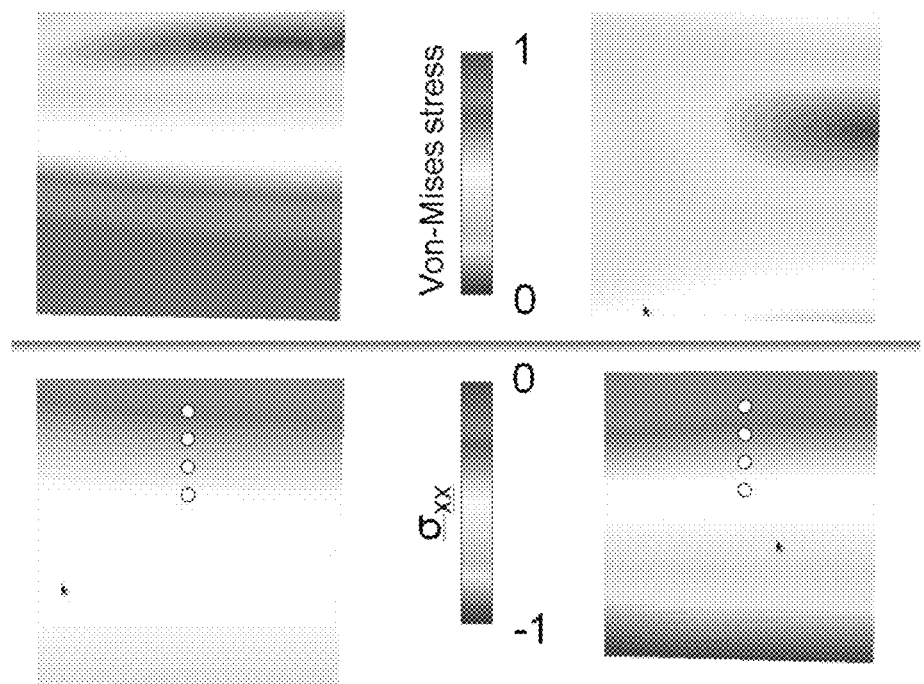

Applications of the example implementations of the method are shown on FIGS. 2-3.

FIG. 2 shows the difference of the cost function evolution with inversion iteration when the yield constraint is or is not introduced in the cost function. The model used consists in a homogeneous single layer model with four data points. The boundary conditions are applied on two lateral faces of the model.

The figure shows, as a function of inversion iterations, Cost function J, of equation (1) on the left and of equation (3) on the right. Curve 22 measures the data term while curve 24 measures the constraint cost. On the left plot the latter is not introduced in the cost function. The optimization of the cost corresponding to equation (1) steadily reduces the difference between data and simulated points but the yield criterion increases during the second part of optimization. The optimization of the cost corresponding to equation (3) steadily reduces first the yield criterion constraint and afterwards the difference between data and simulated points.

FIG. 3 shows Von-Mises stress (top) and $\sigma_{xx}$ (bottom) for, on the left, the cost function of equation (1) (without yield constraint), and on the right, the cost function of equation (3) (with yield criterion). The threshold used for the yield criterion is 1, which is largely exceeded when no constraint is used and completely respected when constraints are used. The value of $\sigma_{xx}$ is relatively similar in both cases near data points but differs where no data is available.

The following table shows that the match to data point is almost the same in both cases:

| Stress-position | No constraint (equation 1) | True value | With constraint (equation 3) |
|---|---|---|---|
| $\sigma_{xx}^1$ | −0.21 | −0.22 | −0.20 |
| $\sigma_{yy}^1$ | −0.21 | −0.22 | −0.20 |
| $\sigma_{xx}^2$ | −0.29 | −0.29 | −0.27 |
| $\sigma_{yy}^2$ | −0.30 | −0.29 | −0.25 |
| $\sigma_{xx}^3$ | −0.37 | −0.36 | −0.36 |
| $\sigma_{yy}^3$ | −0.36 | −0.36 | −0.38 |
| $\sigma_{xx}^4$ | −0.42 | −0.42 | −0.48 |
| $\sigma_{yy}^4$ | −0.43 | −0.42 | −0.46 |

This means that the improvement of accuracy at non-measured data points allowed by the introduction of the second penalty terms in the cost function does not come with a degradation of the optimization at the measured data points.

In the example implementations discussed above the constraints were that the yield criterion be not reached. It should however be understood that the method may alternatively or additionally integrate constraints using other ways:

For example, instead of constraining the solution to be lower than a given constraint it is possible to introduce in the optimization a constraint that states that the criterion is reached at a set of points (e.g. at fault position). This observation can be obtained from geological considerations or as a hypothesis to check its consistency with other observed data.

As another example, opening fractures (faults) during field production: it is equally possible to constraint the change of yield criterion during simulations at different times of life of the field i.e. with a change of pressure inside the reservoir. If there are some evidence that during production fractures have opened, the method may introduce a double constraint: threshold is not reached for the reservoir at initial pressure state and is reached after depletion.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the methods is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 4:
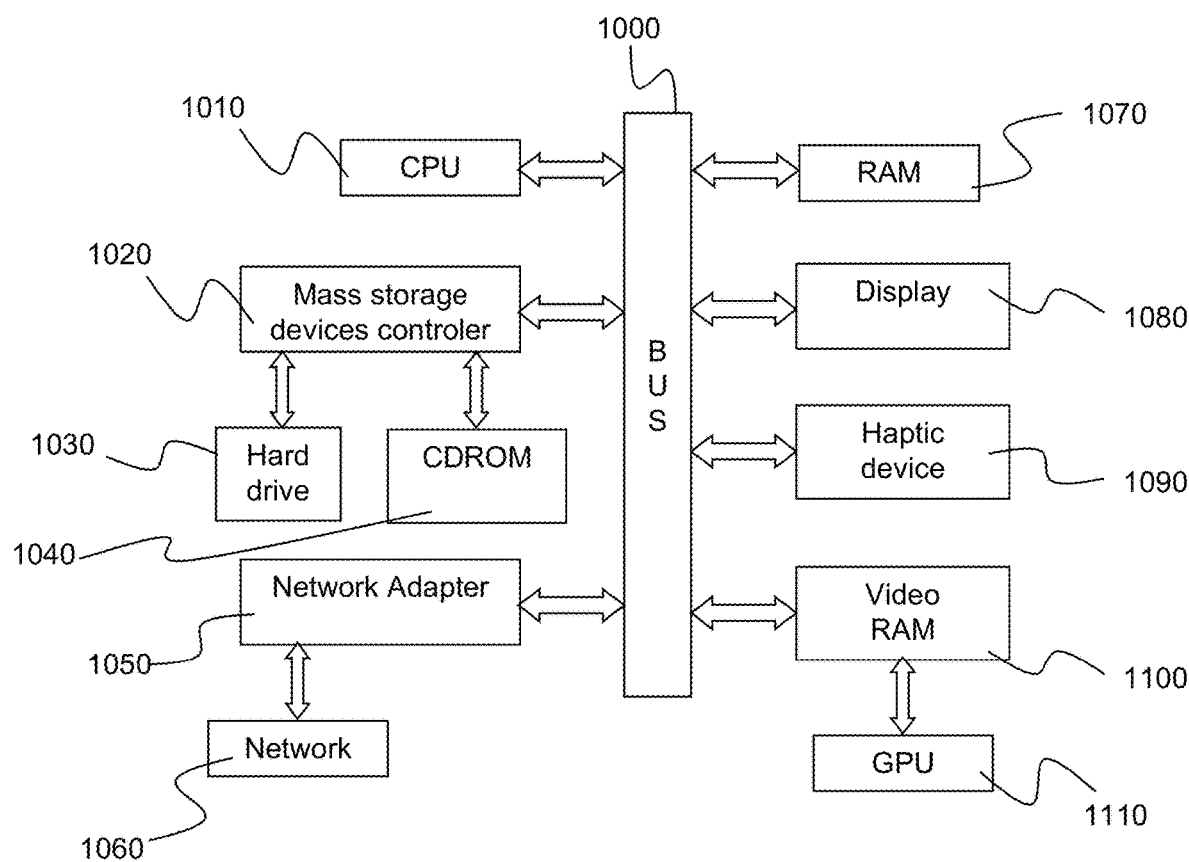
FIG. 4 shows an example of the system.

FIG. 4 shows an example of the system, wherein the system is a client computer system, e.g. a workstation of a user.

The client computer of the example comprises a central processing unit (CPU) 1010 connected to an internal communication BUS 1000, a random access memory (RAM)

1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

What is claimed is:

1. A computer-implemented method for estimating in situ stress field of a geological environment, the method comprising:
   providing:
      a geomechanical model of the geological environment,
      measurements of a first geological attribute each performed at a respective first position of the geological environment,
      constraints on a second geological attribute related to a yield criterion and each assigned to a respective second position of the geological environment, the yield criterion being a mechanical threshold on a geological attribute, one or more of the constraints being that the yield criterion be not reached and/or one or more of the constraints being that the criterion be reached, and
      a geomechanical simulator configured to take as input the geomechanical model and a set of one or more boundary conditions defined on the geomechanical model, and to output data from which are derivable:
         values of the first geological attribute each at a respective first position of the measurements,
         values of the second geological attribute each at a respective second position of the constraints, and
         a stress field distributed on the geological environment; and
   determining the stress field derivable from the data outputted by the geomechanical simulator taking as input the geomechanical model and an optimal set of one or more boundary conditions, the optimal set optimizing a program rewarding for each respective one of candidate sets of one or more boundary conditions:
      consistency between the measurements and the values of the first geological attribute, and
      respect of the constraints by the values of the second geological attribute by the method thereby integrating in the optimization the hypothesis that at certain positions yielding does not occur and/or the hypothesis that at certain positions yielding occurs.

2. The method of claim 1, wherein determining the stress field comprises minimizing a cost function, and the cost function includes:
   a first term that penalizes, for each respective first position, a distance between the measurement and the value of the first geological attribute, and
   a second term that penalizes, for each respective second position, an extent of not respecting the constraint by the value of the second geological attribute.

3. The method of claim 2, wherein minimizing the cost function is performed with a Covariance Matrix Adaptation Evolution Strategy (CMA-ES).

4. The method of claim 2, wherein the second term comprises a sum of second penalties, each second penalty consisting of a transfer function applied to the extent of not respecting the constraint by the value of the second geological attribute.

5. The method of claim 4, wherein the transfer function is a sigmoid varying from 0 to a positive number.

6. The method of claim 1, wherein the yield criterion is a Drucker Prager criterion.

7. The method of claim 1, wherein the geological environment is a subsoil subject to extraction and/or injection.

8. The method of claim 7, wherein determining the stress field is performed:
   during or after:
      well drilling,
      oil and/or gas extraction, or
      hydraulic fracturing,
   or before:
      well drilling,
      oil and/or gas extraction, or
      hydraulic fracturing.

9. The method of claim 7, wherein the first positions are located at one or more wells.

10. The method of claim 7, wherein the second positions substantially cover:
   the subsoil, or
   one or more regions of the subsoil surrounding a well and/or a fault.

11. The method of claim 7, wherein the subsoil is a subsoil subject to oil and/or gas production.

12. A system for estimating in situ stress field of a geological environment, the system comprising one or more hardware processors configured to:
access:
a geomechanical model of the geological environment;
measurements of a first geological attribute each performed at a respective first position of the geological environment,
constraints on a second geological attribute related to a yield criterion and each assigned to a respective second position of the geological environment, the yield criterion being a mechanical threshold on a geological attribute, one or more of the constraints being that the yield criterion be not reached and/or one or more of the constraints being that the criterion be reached, and
a geomechanical simulator configured to take as input the geomechanical model and a set of one or more boundary conditions defined on the geomechanical model, and to output data from which are derivable:
values of the first geological attribute each at a respective first position of the measurements,
values of the second geological attribute each at a respective second position of the constraints, and
a stress field distributed on the geological environment; and
determine the stress field derivable from the data outputted by the geomechanical simulator taking as input the geomechanical model and an optimal set of one or more boundary conditions, the optimal set optimizing a program rewarding for each respective one of candidate sets of one or more boundary conditions:
consistency between the measurements and the values of the first geological attribute, and
respect of the constraints by the values of the second geological attribute, the method thereby integrating in the optimization the hypothesis that at certain positions yielding does not occur and/or the hypothesis that at certain positions yielding occurs.

13. The system of claim 12, wherein said determining the stress field comprises minimizing a cost function, said cost function includes:
a first term that penalizes, for each respective first position, a distance between the measurement and the value of the first geological attribute, and
a second term that penalizes, for each respective second position, an extent of not respecting the constraint by the value of the second geological attribute.

14. The system of claim 13, wherein said minimizing the cost function is performed with a Covariance Matrix Adaptation Evolution Strategy (CMA-ES).

15. The system of claim 13, wherein the second term comprises a sum of second penalties, each second penalty consisting of a transfer function applied to the extent of not respecting the constraint by the value of the second geological attribute.

16. The method of claim 12, wherein the geological environment is a subsoil subject to extraction and/or injection.

17. A non-transitory physical computer storage medium comprising computer-executable storage instructions stored thereon that, when executed by one or more hardware processors, are configured to implement a process comprising:
accessing:
a geomechanical model of the geological environment;
measurements of a first geological attribute each performed at a respective first position of the geological environment,
constraints on a second geological attribute related to a yield criterion and each assigned to a respective second position of the geological environment, the yield criterion being a mechanical threshold on a geological attribute, one or more of the constraints being that the yield criterion be not reached and/or one or more of the constraints being that the criterion be reached, and
a geomechanical simulator configured to take as input the geomechanical model and a set of one or more boundary conditions defined on the geomechanical model, and to output data from which are derivable:
values of the first geological attribute each at a respective first position of the measurements,
values of the second geological attribute each at a respective second position of the constraints, and
a stress field distributed on the geological environment; and
determining the stress field derivable from the data outputted by the geomechanical simulator taking as input the geomechanical model and an optimal set of one or more boundary conditions, the optimal set optimizing a program rewarding for each respective one of candidate sets of one or more boundary conditions:
consistency between the measurements and the values of the first geological attribute, and
respect of the constraints by the values of the second geological attribute, the method thereby integrating in the optimization the hypothesis that at certain positions yielding does not occur and/or the hypothesis that at certain positions yielding occurs.

18. The non-transitory physical computer storage medium of claim 17, wherein said determining the stress field comprises minimizing a cost function, said cost function includes:
a first term that penalizes, for each respective first position, a distance between the measurement and the value of the first geological attribute, and
a second term that penalizes, for each respective second position, an extent of not respecting the constraint by the value of the second geological attribute.

19. The non-transitory physical computer storage medium of claim 18, wherein said minimizing the cost function is performed with a Covariance Matrix Adaptation Evolution Strategy (CMA-ES).

20. The non-transitory physical computer storage medium of claim 18, wherein the second term comprises a sum of second penalties, each second penalty consisting of a transfer function applied to the extent of not respecting the constraint by the value of the second geological attribute.

* * * * *